(12) United States Patent
Yu

(10) Patent No.: US 9,411,079 B1
(45) Date of Patent: Aug. 9, 2016

(54) SYSTEM TO ALLOCATE LUMINANCE

(71) Applicant: Vode Lighting LLC, Sonoma, CA (US)

(72) Inventor: Scott S. Yu, Tiburon, CA (US)

(*) Notice: Subject to any disclaimer, the term of this patent is extended or adjusted under 35 U.S.C. 154(b) by 222 days.

(21) Appl. No.: 14/137,413

(22) Filed: Dec. 20, 2013

Related U.S. Application Data

(60) Provisional application No. 61/740,799, filed on Dec. 21, 2012, provisional application No. 61/740,819, filed on Dec. 21, 2012.

(51) Int. Cl.
*G02B 5/02* (2006.01)
*F21V 5/04* (2006.01)
*F21V 5/08* (2006.01)

(52) U.S. Cl.
CPC ... *G02B 5/02* (2013.01); *F21V 5/04* (2013.01); *F21V 5/08* (2013.01); *G02B 5/0257* (2013.01)

(58) Field of Classification Search
CPC ............... F21V 5/04; F21V 5/08; G05B 5/02; G05B 5/0257
USPC .................................................. 362/223, 355
See application file for complete search history.

(56) References Cited

U.S. PATENT DOCUMENTS

| | | | | |
|---|---|---|---|---|
| 6,618,106 B1* | 9/2003 | Gunn | ............... | G02F 1/133621 349/95 |
| 8,933,916 B1* | 1/2015 | Doar | ................... | G09G 3/3406 345/207 |
| 2011/0194306 A1* | 8/2011 | Krijn | ..................... | G02B 6/004 362/607 |

* cited by examiner

*Primary Examiner* — David V Bruce
(74) *Attorney, Agent, or Firm* — Antero & Tormey PC; Peter Tormey

(57) ABSTRACT

A device comprising a light source such as an LED or fluorescent lamp, having disposed near the light source a panel or lens effectuated with a diffusion pattern for modifying the light emitted from the light source. The diffusion pattern may include an optical gradient wherein light emitted from the light source is substantially blocked at one end of the gradient and substantially passed at the other end of the gradient. In some embodiments the panel or lens is transparent or clear. Other embodiments include a diffusion pattern having a dot matrix pattern or an array of substantially circular opaque areas, which may be disposed near and edge of the panel or lens.

11 Claims, 3 Drawing Sheets

SYSTEM TO ALLOCATE LUMINANCE

PRIORITY

This application claims the benefit of provisional patent applications No. 61/740,799 entitled "A System To Allocate Luminance" and No. 61/740,819 entitled "A System And Method For The Distribution Of Luminance" both by the same inventor, filed Dec. 21, 2012, both of which are incorporated by reference as if fully set forth herein.

BACKGROUND

The present invention relates generally to a luminaire and more particularly to system to distribute light, which includes a plurality of lighting fixture components.

There are many factors that control the market for luminaires and lighting systems. A few important factors are the ability to create a well-lit hospitable environment, cost efficiency such as operating cost and other associated costs, code compliance, and lighting quality more particularly the distribution of light and shadows. Traditional luminaires create shadows, specifically hard shadows which are crisply defined and have sharp edges. This can produces a more harsh or inhospitable environment. This issue is magnified when luminance is needed for highlighting an article, such as a statute in a museum or a model's face, because the hard shadows may cast lines onto the article making the article's details difficult to view. To make the environment's luminance more comfortable and make articles in the surrounding area look more natural, the elimination of bold shadows is needed. What is sought after is a soft shadow, which is less distinct and fades off toward the edges. Soft shadows do no cast sharp lines as hard shadows do. Hard shadows have an umbra, a completely dark shadow cast by an object. Whereas soft shadows have both an umbra and a penumbra, which is a partial shadow between the complete shadow and complete luminance, where part of the light source is visible. Hard shadows have a sharp transition between complete luminance and umbra, which creates distinct lines.

As such, there is a demand for a luminaire that casts a soft shadow, thus producing a graduated shadow with no distinct lines.

SUMMARY

Disclosed herein is a device comprising: a housing, said housing may be disposed to receive a panel (or lens); a panel coupled to the housing, said panel having a pattern; and a light source coupled to the housing. The panel may be transparent and the pattern on the panel may be a dot matrix pattern.

The construction and method of operation of the invention, however, together with additional objectives and advantages thereof will be best understood from the following description of specific embodiments when read in connection with the accompanying drawings.

DESCRIPTION

Figure 1:
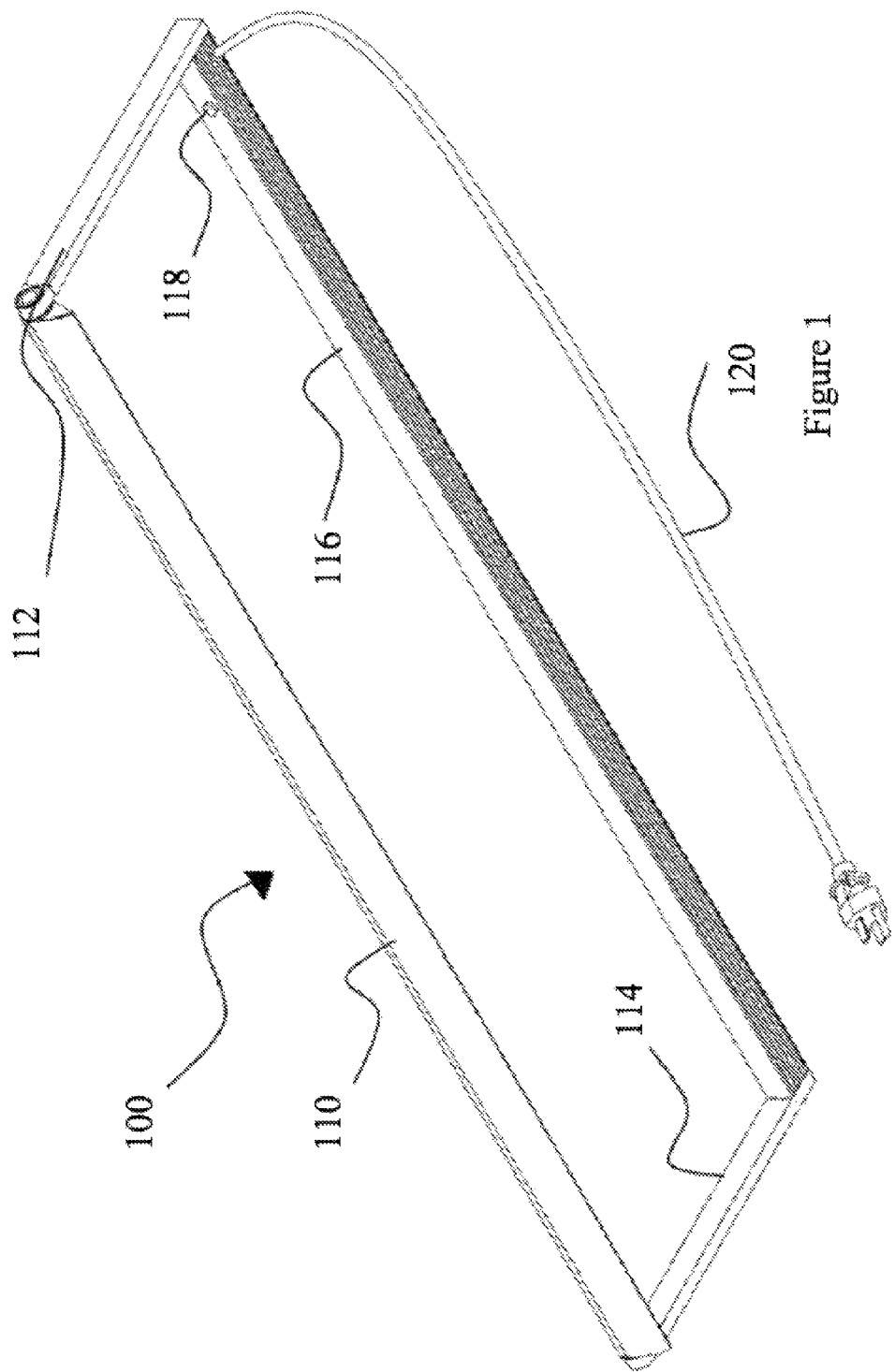
FIG. 1 illustrates one embodiment of the system to allocate luminance according to aspect of the current disclosure.

Specific examples of components and arrangements are described below to simplify the present disclosure. These are, of course, merely examples and are not intended to be limiting in any way. In addition, the present disclosure may repeat reference numerals and/or letters in the various examples. This repetition is for the purpose of simplicity and clarity and does not in itself dictate a relationship between the various embodiments and/or configurations discussed.

Read this application with the following terms and phrases in their most general form. The general meaning of each of these terms or phrases is illustrative, not in any way limiting.

Lexicography

The term "luminaire" generally refers to a lighting unit consisting of a light source, such as a lamp (or lamps) together with the parts designed to distribute the light, to position and protect the lamps and to connect the lamps to the power supply.

The term "luminance" generally refers to the brightness of a light source or an object that has been illuminated by a source.

The term "umbra" generally refers to the substantially dark shadow cast by an object.

The term "penumbra" generally refers to the partial shadow between the umbra and complete luminance, where part of the light source is visible.

DETAILED DESCRIPTION

FIG. 1 illustrates one embodiment of the system to allocate luminance 100 according to aspect of the current disclosure. In particular, the system to allocate luminance 100 is one embodiment of a luminaire over a workspace. In the figure a light rail 110 is connected to two support arms 112 and 114. The light rail 110 houses a light source such as a fluorescent lamp, incandescent bulb or light emitting diode (LED) and a shadow-casting pattern lens, (not shown in detail). The support arms are connected to a chassis 116 which may include ballast for a lamp. Also the chassis 116 may be used to assist in the progress of mounting the luminaire above a structure. This embodiment would typically mount under an overhead storage cabinet or bookshelf located above a desk. Power is supplied to the lamp through electrical cable 118 and power switch 120.

Figure 2:
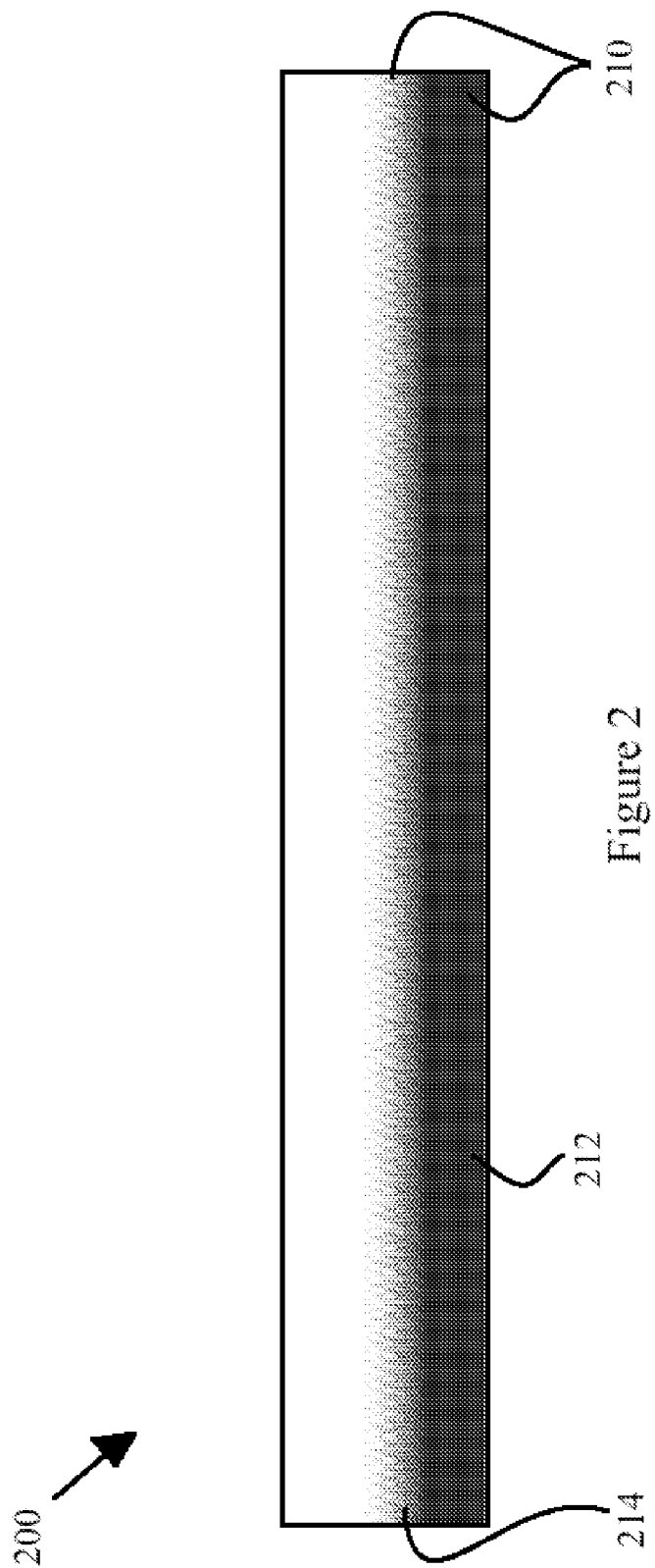
FIG. 2 depicts one embodiment of a soft-shadow-casting pattern lens.

FIG. 2 depicts one embodiment of a shadow-casting pattern lens 200. This shadow-casting pattern shown in the figure is a dot matrix pattern 210 (infra). The dot matrix pattern 210 may be composed of many dots or any relatively small shape. The dot matrix pattern 210 has a gradient of a highly dense layer of dots 212 to a sparse layer of dots 214. The shadow-casting pattern lens 200, when placed in front of a lamp, affects the pattern of luminance and shadow pattern in the surrounding area. As light from the lamp passes through the lens, the percentage of visible portions of the lamp and the light distributed as it shines through the sparse layer of dots 214 is larger than when passing through the highly dense layer of dots 212, which allows no light to pass. The shadow-casting pattern lens 200 diffuses the light from the lamp. The intensity of the light passing through the shadow-casting pattern lens 200 smoothly varies from no shadow to a complete shadow. This shadow pattern created from the shadow-casting pattern lens 200 generates regions of umbra and penumbra. As suggested above, the penumbra of the shadow allows for more visible luminance than the umbra of the shadow. This type of light pattern is diffuse and creates no visible hard lines. Thus employing the shadow-casting pattern lens 200 in a luminaire casts a soft shadow. This type of luminance with a soft cut off on one side and sharp cut off on the other is optimal for lighting articles on display. Applying an inverted shadow-casting pattern to the bare side of the shadow-casting pattern lens 200 will eliminate the sharp cut off luminance on the other side. This would create soft shadows on both sides casting no visible hard lines.

Figure 3:
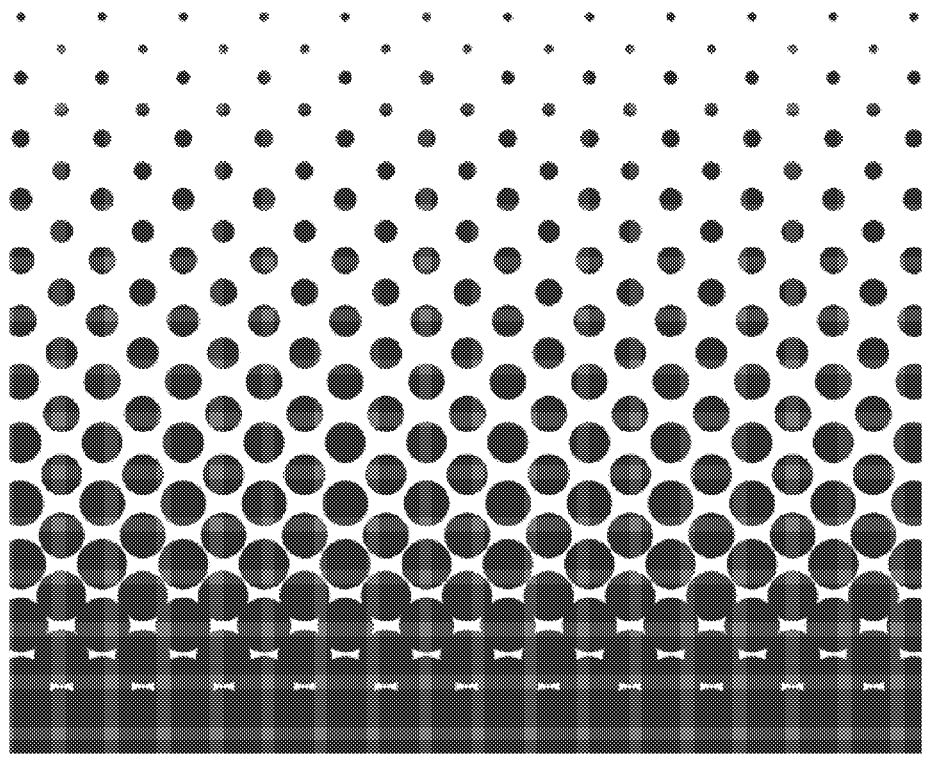
FIG. 3 shows one embodiment of a soft-shadow-casting pattern.

FIG. 3 shows one embodiment of a soft shadow-casting pattern. The pattern shown is a gradient from completely dark to completely clear with a pattern comprised of relatively darker circles for blocking light. The pattern shown in FIG. 3 includes a large to small gradient of dark indicia. At one end the pattern blocks 100 per cent of the light, whereas at the other end most light would pass through the pattern. The dark circles are arranged in an array with alternating rows offset. Glare reduction may be achieved using the pattern shown or similar patterns to control direct glare from a light source, such as a lamp or LED. In certain cases, indirect glare may also be controlled by diffusing light emissions at the edge of a luminaire.

One having skill in the art will appreciate that results of the dot-matrix light pattern may be effectuated using other patterns. In some embodiments, a clear lens may have a pattern applied by etching, silk-screening and other commercially available techniques. Moreover, the dot-matrix pattern may be disposed on material that is not completely transparent. For example and without limitation, the dot-matrix pattern may be disposed on transparent material or on material having different opacities. This may allow for a luminaire designer to effectuate low glare lighting with diffusion around the edges of the light housing.

References in the specification to "one embodiment", "an embodiment", "an example embodiment", etc., indicate that the embodiment described may include a particular feature, structure or characteristic, but every embodiment may not necessarily include the particular feature, structure or characteristic. Moreover, such phrases are not necessarily referring to the same embodiment. Further, when a particular feature, structure or characteristic is described in connection with an embodiment, it is submitted that it is within the knowledge of one of ordinary skill in the art to effect such feature, structure or characteristic in connection with other embodiments whether or not explicitly described. Parts of the description are presented using terminology commonly employed by those of ordinary skill in the art to convey the substance of their work to others of ordinary skill in the art.

The above illustration provides many different embodiments or embodiments for implementing different features of the invention. Specific embodiments of components and processes are described to help clarify the invention. These are, of course, merely embodiments and are not intended to limit the invention from that described in the claims.

Although the invention is illustrated and described herein as embodied in one or more specific examples, it is nevertheless not intended to be limited to the details shown, since various modifications and structural changes may be made therein without departing from the spirit of the invention and within the scope and range of equivalents of the claims. Accordingly, it is appropriate that the appended claims be construed broadly and in a manner consistent with the scope of the invention, as set forth in the following claims.

I claim:

1. A device comprising:
    a light source;
    a panel disposed near the light source, said panel having a diffusion pattern, said diffusion pattern including an optical gradient wherein light emitted from the light source is substantially blocked at one end of the gradient and substantially passed at the other end of the gradient;
    a housing, said housing operative to support the light source and the panel, said housing further operative to block at least a portion of the light emitted from the light source.

2. The device of claim 1, wherein said panel is transparent.

3. The device of claim 1, wherein said diffusion pattern includes a dot matrix pattern.

4. The device of claim 1 wherein the diffusion pattern is disposed on the panel substantially near and edge of the panel.

5. The device of claim 1 wherein the light source is either an LED, an incandescent lamp or a fluorescent lamp.

6. The device of claim 1 wherein the diffusion pattern comprised an array of substantially circular opaque areas.

7. A device including:
    a housing, said housing including a light source and a lens;
    said lens including a diffusion pattern, said diffusion pattern including a plurality of substantially circular opaque areas arranged in an array.

8. The device of claim 7, wherein said opaque areas are arrange to form an optical gradient.

9. The device of claim 7 wherein the light source is either an LED, an incandescent lamp or a fluorescent lamp.

10. The device of claim 7 wherein the diffusion pattern is disposed on the lens substantially near and edge of the lens.

11. The device of claim 10 wherein the edge of the lens is disposed substantially near the housing.

\* \* \* \* \*